United States Patent
Choi et al.

(10) Patent No.: US 7,615,917 B2
(45) Date of Patent: Nov. 10, 2009

(54) ELECTRON EMISSION SOURCE, METHOD OF PREPARING THE SAME, AND ELECTRON EMISSION DEVICE EMPLOYING THE ELECTRON EMISSION SOURCE

(75) Inventors: Young-Chul Choi, Suwon-si (KR); Jae-Myung Kim, Suwon-si (KR); Chang-Wook Kim, Suwon-si (KR); Eun-Mi Lee, Suwon-si (KR); Joong-Woo Nam, Suwon-si (KR); Sung-Hee Cho, Suwon-si (KR); Jong-Hwan Park, Suwon-si (KR); Ji-Soon Ihm, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 351 days.

(21) Appl. No.: 11/491,997

(22) Filed: Jul. 25, 2006

(65) Prior Publication Data

US 2007/0024177 A1 Feb. 1, 2007

(30) Foreign Application Priority Data

Jul. 29, 2005 (KR) ...................... 10-2005-0069639

(51) Int. Cl.
*H01J 1/62* (2006.01)
(52) U.S. Cl. ...................... 313/495; 313/309
(58) Field of Classification Search ................ 313/495, 313/309, 310, 336, 351
See application file for complete search history.

(56) References Cited

U.S. PATENT DOCUMENTS 5,469,014 A * 11/1995 Itoh et al. ............... 313/308
6,436,221 B1   8/2002 Chang et al.

FOREIGN PATENT DOCUMENTS

| CN | 1581400 A | 2/2005 |
| JP | 2005197247 A | 7/2005 |

* cited by examiner

*Primary Examiner*—Vip Patel
(74) *Attorney, Agent, or Firm*—Robert E. Bushnell, Esq.

(57) ABSTRACT

An electron emission source including a carbon-based material coated with metal carbide in the surface coating layer, of which the metal has a negative Gibbs free energy when forming the metal carbide at 1,500 K or lower, a method of preparing electron emission sources, and an electron emission device including the electron emission source. The electron emission source includes a carbon nanotube coated with metal carbide or a carbon nanotube having a metal carbide layer and a metal coating layer, which are sequentially formed thereon. Thus, the electron emission source has long lifespan without deterioration of electron emitting characteristics. The electron emission source can be used to manufacture electron emission devices with improved reliability.

14 Claims, 2 Drawing Sheets

ELECTRON EMISSION SOURCE, METHOD OF PREPARING THE SAME, AND ELECTRON EMISSION DEVICE EMPLOYING THE ELECTRON EMISSION SOURCE

CLAIM OF PRIORITY

This application claims the priority of Korean Patent Application No. 10-2005-0069639, filed on Jul. 29, 2005, in the Korean Intellectual Property Office, the disclosure of which is incorporated herein in its entirety by reference.

BACKGROUND OF THE INVENTION

1. Field of the Invention

The present invention relates to an electron emission source, a method of preparing the same, and an electron emission device employing the electron emission source, and more particularly, to an electron emission source having long lifespan without reducing current density, a method of preparing the same, and an electron emission device employing the electron emission source to have improved reliability.

2. Description of the Related Art

An electron emission device includes an anode and a cathode. A voltage is applied between the anode and the cathode to form an electric field. As a result, an electron emission source of the cathode emits electrons. The electrons collide with a phosphorous material of the anode to emit light.

A carbon-based material including a carbon nanotube (CNT), which has strong electron conductivity, has various advantages such as strong conductivity, high field enhancement effect, a low work function, and excellent electron emitting characteristics. Furthermore, the carbon-based material can be operated at low voltage, and manufactured in a large area. Therefore, the carbon-based material is expected to be an ideal electron emission source of an electron emitting device.

Methods of preparing electron emission sources containing carbon nanotubes include, for example, a carbon nanotube growing method using chemical vapor deposition (CVD), etc., a paste method using a composition for forming electron emission sources that contain carbon nanotubes. When using the paste method, the manufacturing costs decrease, and large-area electron emission sources can be obtained.

Examples of the composition for forming electron emission sources that contains carbon nanotubes are disclosed, for example, in U.S. Pat. No. 6,436,221.

In electron emission sources containing carbon nanotubes, the temperature of the end of carbon nanotubes is increased to 1,500 K or higher by joule heating when emitting electrons. Due to this, the carbon nanotubes react with oxygen in electron emission devices during driving the devices, resulting in deterioration of electron emission sources. This adversely affects the lifespan of electron emission devices.

SUMMARY OF THE INVENTION

The present invention provides an electron emission source having long lifespan without deterioration of electron emitting characteristics, a method of preparing the same, and an electron emission device employing the electron emission source to have improved reliability.

According to an aspect of the present invention, there is provided an electron emission source including a carbon-based material and a coating layer composed of metal carbide coated on the carbon-based material, the metal of the metal carbide having a negative Gibbs free energy of the formation of the metal carbide at about 1,500 K or lower.

According to yet another aspect of the present invention, there is provided an electron emission source including a carbon-based material; and a coating layer composed of metal coated on the carbon-based material, the metal having a negative Gibbs free energy of the formation of metal carbide at 1,500 K or lower.

According to another aspect of the present invention, there is provided a method of preparing electron emission sources, the method including: preparing a carbon-based material coated with metal or combination of metal having a negative Gibbs free energy when forming metal carbide or combination of metal carbide at 1,500 K or lower; applying a composition containing the metal-coated carbon-based material to a substrate; and sintering the composition applied to the substrate.

A metal carbide layer is formed between the metal coating layer and a carbon-based material when a heating process is performed to form the metal coating layer or joule heat is generated resulting in temperature rising during emitting electrons in electron emission sources.

According to another aspect of the present invention, there is provided an electron emission device including: a first substrate; a second substrate arranged to face the first substrate; a cathode formed on the first substrate; an electron emission source electrically connected to the cathode; an anode formed on the second substrate; and a phosphor layer emitting light by collision with electrons emitted from the electron emission sources.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
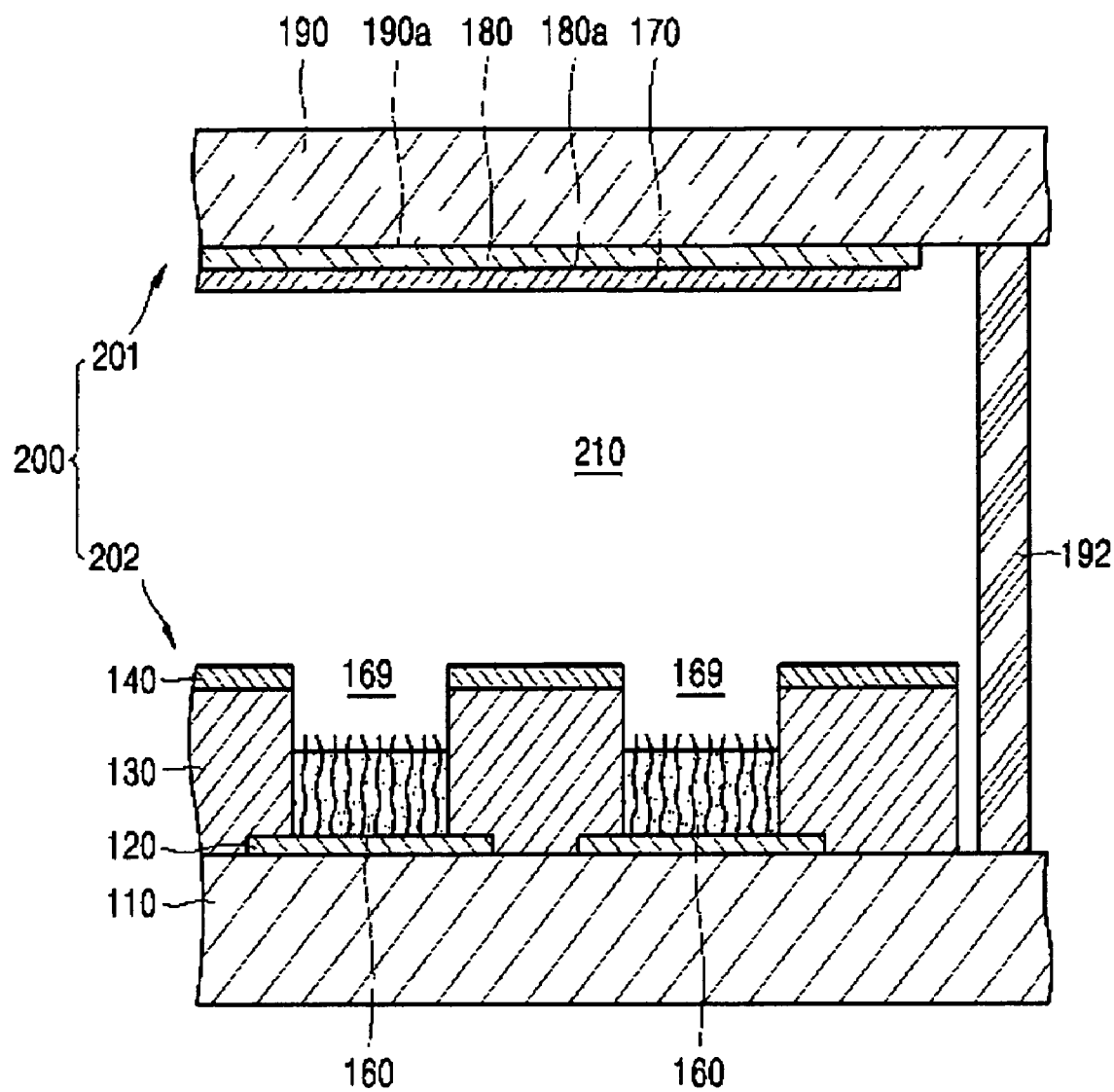
FIG. 1 is a cross-sectional view of an electron emission device according to an embodiment of the present invention.

Hereinafter, the present invention will be described in detail.

To improve lifespan of an electron emission source without deterioration of electron emitting characteristics by forming a coating layer on the surface of a carbon-based material such as a carbon nanotube, interfacial properties between the carbon nanotube and the coating layer should be superior.

In a preferred embodiment of the present invention, a coating layer (also referred to as a surface coating layer) of metal carbides is formed at the interface between the carbon nanotube and the metal coating layers, of which the metal have negative Gibbs free energy when forming metal carbide at about 1,500 K or lower. Alternatively, the carbon nanotube is coated to form a coated layer with metal carbide or combination of metal carbide formed from metal or combination of metal.

In some cases, a surface coating layer formed of metal or combination of metal may be formed on the carbon nanotube. Such a surface coating layer can be obtained when a heating process is not performed.

In this specification and the claims, the terms "metal" and "metal carbide" are interpreted as including "combination of metal" and "combination of metal carbide," respectively.

The temperature of about 1,500 K or lower is set because an electron emission source is heated to approximately 1,500 K to 2,000 K by joule heating when electrons are emitted from an electron tip.

The metal carbide may include at least one selected from the group consisting of carbides of Ti, Zr, Hf, Ta, Nb, V, Cr, Mo, and W. For example, the Gibbs free energy of the reaction Ti+C→TiC at 1,000 K is −20.7 kcal/g-atom.

The amount of the metal carbide may be 0.01 to 10 parts by weight based on 1 part by weight of the carbon nanotube. When the amount of the metal carbide is less than 0.01 part by weight, electron transfer from the carbon nanotube to the metal is not easy. When the amount of the metal carbide is greater than 10 parts by weight, the electron emitting characteristics deteriorate.

A method of forming the surface coating layer of metal(s) or metal carbide(s) is not particularly restricted, but solution coating, chemical vapor deposition, or physical vapor deposition is used. When such methods are used, the coating layer can be very easily formed. The thickness of the surface coating layer may be 1 to 1,000 nm. When the thickness of the surface coating layer is less than 1 nm, the metal carbide interface layer is not easily formed. When the thickness of the surface coating layer is greater than 1,000 nm, the electron emitting characteristics deteriorate.

On the surface coating layer of metal carbide or combination of metal carbide formed on the carbon-based material, metal having a negative Gibbs free energy when forming metal carbide at 1,500 K or lower may be further coated. The total thickness of the surface coating layer and the metal coating layer may be 1 to 1,000 nm. When the total thickness is less than 1 nm, the metal carbide interface layer is not easily formed. When the total thickness is greater than 1,000 nm, the electron emitting characteristics deteriorate.

A composition for forming electron emission sources according to an embodiment of the present invention may include a carbon-based material, a vehicle, and frit, preferably Pb-free frit.

The amount of the frit may be 0.25 to 10 parts by weight based on 1 part by weight of the carbon-based material. When the amount of the frit is less than 0.25 part by weight, the electron emission source poorly adheres to a substrate. When the amount of the frit is greater than 10 parts by weight, the electron emitting characteristics deteriorate.

The carbon-based material having good conductivity and electron emission characteristics emits electrons to a phosphor layer of an anode to excite phosphors when operating an electron emission device. Examples of the carbon-based material include, but are not limited to, carbon nanotubes, graphite, diamond, fullerene, and silicon carbide. Among these, carbon nanotubes are preferred.

The vehicle contained in the composition for forming electron emission sources adjusts the printability and viscosity of the composition. The vehicle may contain a resin component and a solvent component.

The resin component may include, but is not limited to, at least one of cellulose-based resins, such as ethyl cellulose, nitro cellulose, etc., acrylic resins, such as polyester acrylate, epoxy acrylate, urethane acrylate, etc., and vinyl resins, such as polyvinyl acetate, polyvinyl butylal, polyvinyl ether, etc. Some of the above-listed resin components also can act as photosensitive resins.

The solvent component may include at least one of, for example, terpineol, butyl carbitol (BC), butyl carbitol acetate (BCA), toluene, and texanol. It is preferable that the solvent component includes terpineol.

The amount of the resin component may be 1 to 5 parts by weight, preferably 2 to 3 parts by weight, based on 1 part by weight of the carbon-based material.

The amount of the solvent component may be 5 to 15 parts by weight, preferably 8 to 12 parts by weight, based on 1 part by weight of the carbon-based material. When the amount of the vehicle composed of the resin component and the solvent component does not lie within the above-described ranges, the printability and the flowability of the composition deteriorate. Especially, when the amount of the vehicle exceeds the above-described range, the drying time may be too long.

The composition for forming electron emission sources according to an embodiment of the present invention may further include a photosensitive resin a photoinitiator, and/or a filler.

The photosensitive resin is used to pattern the electron emission sources. Non-limiting examples of the photosensitive resin include acrylic monomers, benzophenone monomers, acetophenone monomers, and thioxanthone monomers. In particular, epoxy acrylate, polyester acrylate, 2,4-diethyloxanthone, and 2,2-dimethoxy-2-phenylacetophenon can be used as the photosensitive resin. The amount of the photosensitive resin may be 3-10 parts by weight, preferably 5-8 parts by weight, based on 1 part by weight of the carbon-based material. When the amount of the photosensitive resin is less than 3 parts by weight based on 1 part by weight of the carbon-based material, the exposure sensitivity decreases. When the amount of the photosensitive resin is greater than 10 parts by weight based on 1 part by weight of the carbon-based material, developing is not smooth.

The photoinitiator initiates cross-linking of the photosensitive resin when exposed to light. Non-limiting examples of the photoinitiator include benzophenone. The amount of the photoinitiator may be 3-10 parts by weight, preferably 5-8 parts weight, based on 1 part by weight of the carbon-based material. When the amount of the photoinitiator is less than 3 parts by weight based on 1 part by weight of the carbon-based material, crosslinking is not effective to form patterns. When the amount of the photoinitiator is greater than 10 parts by weight based on 1 part by weight of the carbon-based material, the manufacturing costs rise.

The filler improves the conductivity of a nano-sized inorganic material which does not strongly adhere to the substrate. Non-limiting examples of the filler include Ag and Al.

A method of preparing electron emission sources using the composition for forming electron emission sources will now be described.

First, metal having a negative Gibbs free energy when forming metal carbide at 1,500 K or lower is coated on a carbon-based material to form a metal coating layer on the carbon-based material. The metal coating method is as described above.

A metal carbide layer is formed between the metal coating layer and the carbon-based material when a heating process is performed to form the metal coating layer or joule heat is generated resulting in temperature rising during emitting electrons in electron emission sources.

The obtained carbon-based material and the above-described components are used to prepare a composition for forming electron emission sources. The composition for forming electron emission sources is as described above, and thus the detailed description thereof will be omitted here.

Next, the composition for forming electron emission sources is applied to a substrate. The substrate on which electron emission sources will be formed may vary according to the type of an electron emission device to be formed, which is obvious to one of skill in the art. For example, when manufacturing an electron emission device with gate electrodes between cathodes and anode, the substrate can be the cathodes. When manufacturing an electron emission device with gate electrodes below cathode, the substrate can be an insulting layer formed between the cathode and the gate electrodes.

The applying the composition for forming electron emission sources to the substrate varies according to whether the composition includes the photosensitive resin. When the composition includes the photosensitive resin, an additional photoresist pattern is not required. That is, the composition including the photosensitive resin is applied to the substrate, and then exposure and developing are performed to define desired electron emission source regions.

When the composition does not include the photosensitive resin, a photolithography process using an additional photoresist pattern is performed. In particular, after a photoresist pattern is formed on the substrate by using a photoresist layer, the composition for forming electron emission sources is applied to the substrate on which the photoresist pattern has been formed.

The composition for forming electron emission sources applied to the substrate as described above is sintered under nitrogen gas atmosphere. Through the sintering treatment, the adhesion of the carbon-based material to the substrate increases, the vehicle volatilizes, and the inorganic binder, etc., melts and solidifies, thereby improving the durability of the electron emission sources.

The sintering treatment temperature is determined according to the volatilization temperature and time of the vehicle contained in the composition for forming electron emission sources. The sintering treatment temperature may be 350 to 500° C., preferably 450° C. When the sintering treatment temperature is lower than 350° C., the volatilization of the vehicle, etc., is insufficient. When the sintering treatment temperature is higher than 500° C., the manufacturing costs rise, and the substrate is damaged.

The sintered structure is optionally subjected to an activation process. In an embodiment, the activation process may be implemented by coating a solution, for example, an electron emission source surface treatment agent containing a polyimide polymer, which is curable in a film form through a thermal process on the surface of the sintered structure, thermally treating the coated structure to obtain a film; and separating the film. In another embodiment, the activation process may be implemented by pressing the surface of the sintered structure at a predetermined pressure using a roller, a surface of which has an adhesive portion, that is driven by a driving source. Such an activation process allows the nano-sized inorganic material to be exposed to the surface of the electron emission sources or to be vertically aligned.

The electron emission source according to an embodiment of the present invention is suitable for electron emission devices used as display devices or back light units.

FIG. 1 is a schematic cross-sectional view of a triode electron emission device according to an embodiment of the present invention.

Referring to FIG. 1, an electron emission device 200 includes an upper plate 201 and a lower plate 202. The upper plate 201 includes an upper substrate 190, an anode 180 arranged on a lower surface 190a of the upper substrate 190, a phosphor layer 170 formed on a lower surface 180a of the anode 180.

The lower plate 202 includes a lower substrate 110 facing the upper substrate 190 by a predetermined distance, cathodes 120 arranged in a stripe form on a lower surface of the lower substrate 110, gate electrodes 140 arranged in a stripe form to cross the cathode, an insulation layer 130 interposed between the gate electrodes 140 and the cathode 120, electron emission source holes 169 formed in a part of the insulating layer 130 and the gate electrodes 140, and an electron emission source 160 which is positioned in the electron emission source holes 169, is electrically connected to the cathode 120, and is lower than the gate electrodes 140. The detailed description of the electron emission source 160 is as described above, and thus will be omitted here.

The space between upper plate 201 and the lower plate 202 is maintained under vacuum which is lower than atmospheric pressure. A spacer 192 is arranged between the upper plate 201 and the lower plate 202 to support the pressure between the upper plate 201 and the lower plate 202 generated by vacuum and to divide a light emitting space 210.

The anode 180 applies a high voltage required to accelerate electrons emitted from the electron emission source 160 to enable the electrons to collide with the phosphor layer 170 at a high speed. Phosphors in the phosphor layer 170 are excited by electrons and are transitioned from a high energy level to a low energy level, thereby emitting visible light.

The gate electrode 140 enables electrons to be easily emitted from the electron emission source 160. The insulating layer 130 divides the electron emission holes 169 and insulates the electron emission source 160 and the gate electrodes 140.

Although the present invention has been described with reference to the triode electron emission device shown in FIG. 1, the present invention can also include electron emission devices with different structures such as, for example, a diode electron emission device, etc. Also, the present invention can be applied to an electron emission device having gate electrodes arranged below cathode, and an electron emission device having a grid/mesh for preventing damage of gate electrodes and/or cathodes due to arc considered to be generated by discharge and for ensuring concentration of electrons emitted from the electron emission source. The structure of the electron emission device can also be applied to display devices.

Hereinafter, the present invention will be described in greater detail with reference to the following examples. The following examples are for illustrative purposes and are not intended to limit the scope of the invention.

SYNTHESIS EXAMPLE 1

Figure 2:
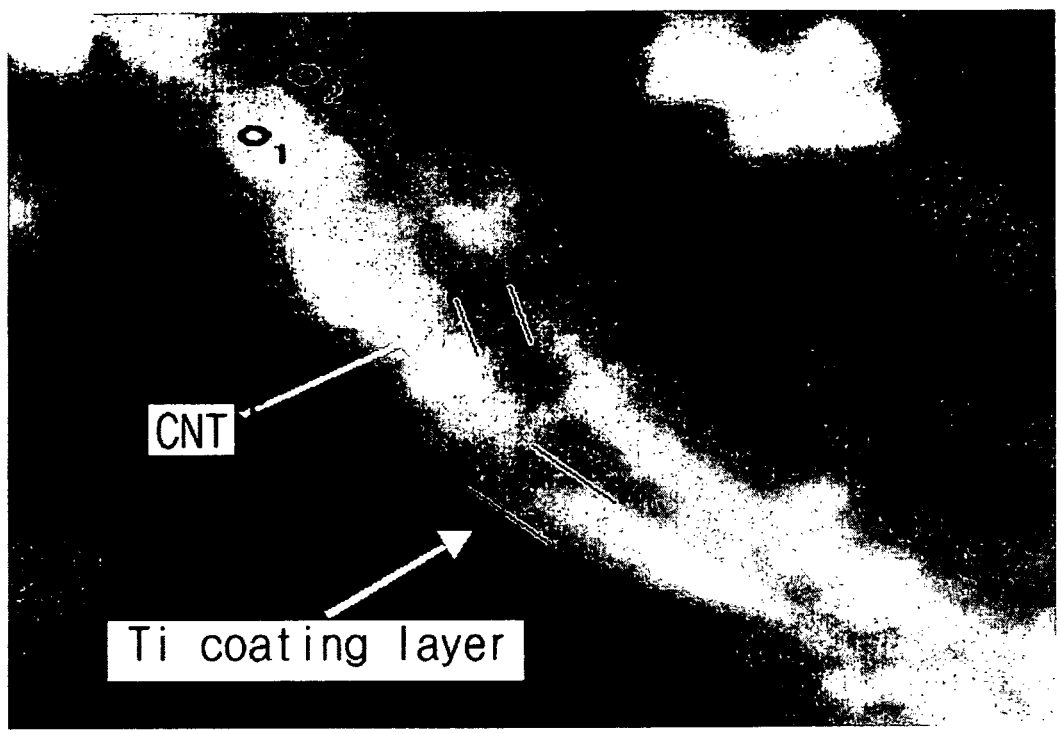
FIG. 2 is a scanning transmission electron microscopic (STEM) image of a carbon nanotube coated with Ti, which is prepared in a Synthesis Example 1 of the present invention.

Ti was coated on CNT (MWNT, available from ILJIN Nanotech Co., Ltd) using a solution coating method to form a 10 nm thick Ti coating layer. FIG. 2 is a scanning transmission electron microscopic (STEM) image of the CNT having the Ti coating layer.

PREPARATION EXAMPLE 1

1 g of the CNT prepared in the Synthesis Example 1, 5 g of polyester acrylate, and 5 g of benzophenone were added into 10 g of terpineol and stirred to obtain a composition for forming electron emission sources.

The composition for forming electron emission sources was applied to an electron emission source regions in a substrate on which Cr gate electrodes, an insulation layer, and ITO electrodes had been formed and exposed to light using a parallel exposure system and a pattern mask at an exposure energy of 2,000 mJ/cm$^2$. After the exposure process, the resulting structure was developed using acetone and heated at 450° C. in the presence of nitrogen gas to obtain electron emission sources.

Next, a substrate with a phosphor layer and ITO anode thereon was arranged to face the substrate on which the electron emission sources had been formed, and spacers were formed between the two substrates to maintain a constant cell gap, thereby resulting an electron emission device.

COMPARATIVE EXAMPLE 1

An electron emission device was manufactured in the same manner as in Example 1, except that CNT (MWNT, available from Iljin Nanotech) without a Ti coating was used instead of the CNT prepared in the Synthesis Example 1.

Figure 3:
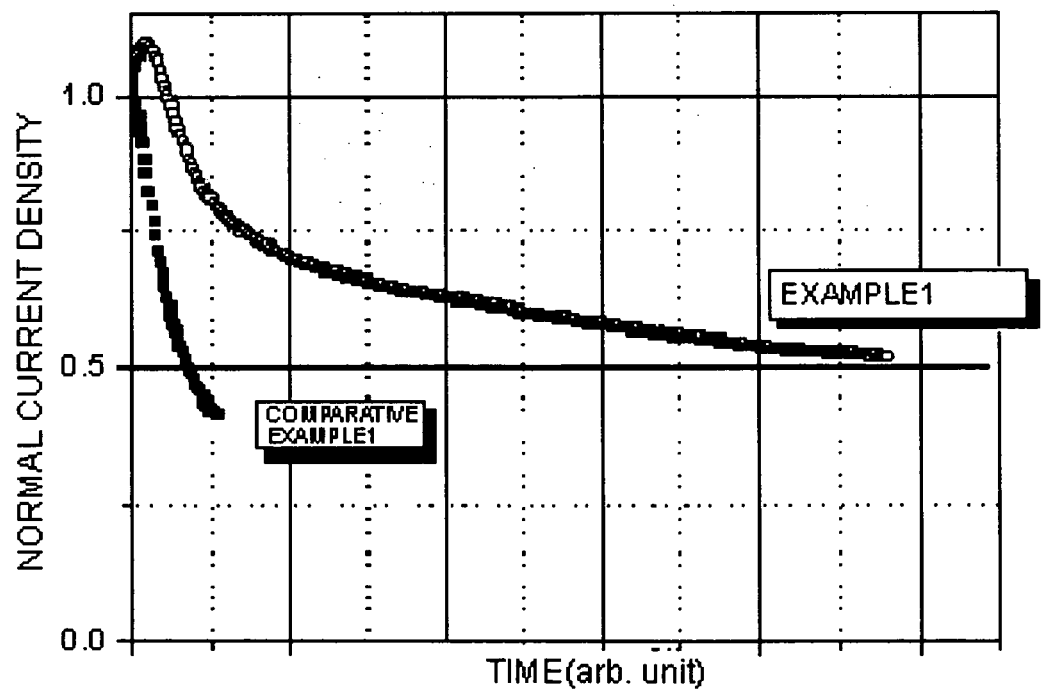
FIG. 3 is a graph of current density versus time of electron emission sources prepared in an Example 1 of the present invention and a Comparative Example 1.

The current density of electron emission devices manufactured in the Example 1 and the Comparative Example 1 was measured using a pulse power source and an ammeter. The lifespan of the electron emission devices was evaluated using a constant voltage mode, i.e., by applying a constant voltage and measuring current according to time. The results are illustrated in FIG. 3.

As a result, the electron emission device of the Example 1 has higher current density than the electron emission device of the Comparative Example 1, and thus has improved electron emitting characteristics and lifespan.

Electron emission sources according to the embodiment of the present invention include a carbon nanotube coated with metal carbide or carbon nanotube sequentially coated with metal carbide and metal. Thus, the electron emission sources have long lifespan without deterioration of electron emitting characteristics. The electron emission sources can be used to manufacture electron emission devices with improved reliability.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electron emission source, comprising:
   a carbon-based material; and
   a coating layer composed of metal carbide coated on the carbon-based material, the metal of the metal carbide having a negative Gibbs free energy of the formation of the metal carbide at about 1,500 K or lower.

2. The electron emission source of claim 1, wherein the metal carbide is at least one selected from the group consisting of carbides Ti, Zr, Hf, Ta, Nb, V, Cr, Mo, and W.

3. The electron emission source of claim 1, wherein the amount of the metal carbide is 0.01 to 10 parts by weight based on 1 part by weight of the carbon-based material.

4. The electron emission source of claim 1, wherein a thickness of the coating layer is 1 to 1,000 nm.

5. The electron emission source of claim 1, wherein metal having a negative Gibbs free energy of the formation of the metal carbide at 1500 K or lower is further coated on the coating layer.

6. The electron emission source of claim 5, wherein the metal further coated on the coating layer is at least one selected from the group consisting of Ti, Zr, Hf, Ta, Nb, V, Cr, Mo, and W.

7. The electron emission source of claim 5, wherein a total thickness of the coating layer and the metal further coated on the coating layer is 1 to 1,000 nm.

8. The electron emission source of claim 1, wherein the carbon-based material is carbon nanotube, graphite, diamond, fullerene, or silicon carbon.

9. The electron emission source of claim 1, further comprising frit in an amount of 0.25 to 10 parts by weight based on 1 part by weight of the carbon-based material.

10. An electron emission device, comprising:
    a first substrate;
    a second substrate arranged to face the first substrate;
    a cathode formed on the first substrate;
    the electron emission source of claim 1, the electron emission source electrically connected to the cathode;
    an anode formed on the second substrate; and
    a phosphor layer emitting light by collision with electrons emitted from the electron emission source.

11. An electron emission source, comprising:
    a carbon-based material; and
    a coating layer composed of metal coated on the carbon-based material, the metal having a negative Gibbs free energy of the formation of metal carbide at 1,500 K or lower.

12. The electron emission source of claim 11, wherein the metal is at least one selected from the group consisting of Ti, Zr, Hf, Ta, Nb, V, Cr, Mo, and W.

13. An electron emission source, comprising:
    a plurality of carbon-based particles;
    a metal carbide layer coated on each one of the carbon-based particles; and
    a metal layer coated on each one of the carbon-based particles that are coated with the metal carbide layer, with the metal carbide layer and the metal layer comprising the same metal, and a Gibbs free energy of a formation of the metal carbide at about 1,500 K or lower being negative.

14. The electron emission source of claim 13, with the carbon-based particle being one selected from a group comprising carbon nanotube, graphite, diamond, fullerene, and silicon carbide.

* * * * *